INCREMENTAL DRIVE MECHANISM

Original Filed Aug. 14, 1967 3 Sheets-Sheet 1

INCREMENTAL DRIVE MECHANISM

Original Filed Aug. 14, 1967 3 Sheets-Sheet 2

INCREMENTAL DRIVE MECHANISM

Original Filed Aug. 14, 1967 3 Sheets-Sheet 3

United States Patent Office

Re. 27,080
Reissued Mar. 2, 1971

27,080
INCREMENTAL DRIVE MECHANISM

Igor Fisnar, Bayside, and Russell H. Lester, Jr., Commack, N.Y., assignors to Fairchild Camera and Instrument Corporation Original No. 3,456,516, dated July 22, 1969, Ser. No. 668,273, Aug. 14, 1967. Application for reissue Dec. 10, 1969, Ser. No. 883,847
Int. Cl. F16h 27/02
U.S. Cl. 74—143 9 Claims

Matter enclosed in heavy brackets [ ] appears in the original patent but forms no part of this reissue specification; matter printed in italics indicates the additions made by reissue.

ABSTRACT OF THE DISCLOSURE

A continuously rotating input shaft drives a single-revolution mechanism which, in turn, oscillates a pair of pawl carriers each carrying a pair of pawls engaging a common ratchet wheel which drives the output shaft. Individually interposed between the pawls and the ratchet wheel is a pair of individually angularly adjustable arcuate masks which limit the engagements between their respective pawls and the ratchet wheel. A shroud encloses the pawls and is movable selectively to disable either of them in order to select either of two preset incremental movements of the output drive shaft for each oscillation of the pawl carriers.

This invention relates to incremental drive mechanisms and, while it is of general application, it is particularly suitable for imparting an adjustable line-by-line advance to a strip-feed transport. By way of illustration, the invention is described in a form designed for driving the film transport of the photocomposing machine described and claimed in copending application Ser. No. 519,906, filed Jan. 11, 1966, now Patent No. 3,434,402, of John M. McCall, and assigned to the same assignee as the present application.

BACKGROUND OF THE INVENTION

The advent of photocomposing machines which compose lines of text photographically, usually on photosensitive film, has created a demand for a considerably more flexible and accurate drive for the film transport. For example, in composing a column for newspapers, the column will include text as well as subheadings and headings which are generally composed in types of larger size than the text so that it becomes necessary to advance the film line-by-line in increments which are adjustable over a wide range. Further, a machine should be capable of composing texts for different publications using different type sizes and styles. In the photocomposing machine described in aforesaid copending application Ser. No. 519,906, it was necessary to advance the film in increments of up to one-half inch in steps of 1/144 inch. It is highly desirable that the drive mechanism be accurately calibrated in terms of the desired incremental advance steps for which it is set and that it provide indicia of the incremental advance for each setting. Furthermore, it is frequently desirable or necessary to switch back and forth quickly between two preset incremental advances without interrupting the operation of the machine. No drive mechanism capable of meeting the foregoing requirements has heretofore been available.

It is an object of the invention therefore to provide a new and improved incremental drive mechanism which will satisfy one or more of the above-mentioned requirements and desirable characteristics for driving a strip-feed mechanism, such as the film transport of a photocomposing machine.

BRIEF SUMMARY OF THE INVENTION

In accordance with the invention, there is provided an incremental drive mechanism comprising an output drive shaft, a ratchet and pawl drive for the drive shaft including a rotatable ratchet wheel and a *plurality of* coaxial [rotatable] *angularly displaced* pawl carriers and pawls, and means for selectively imparting one or more single oscillations to the pawl carriers through a predetermined angle. The drive mechanism further comprises [an] arcuate masks [interposed between] *individually associated with* the pawls *and proportioned to limit engagements of different angular extents between their respective pawls* and the ratchet wheel, [effective to limit the engagement therebetween and] means for angularly adjusting the masks to adjust the *increment of* angular rotation of the [output] drive shaft, *and means for disabling all but a selected one of the pawls.*

BRIEF DESCRIPTION OF THE DRAWINGS

For a better understanding of the present invention, together with other and further objects thereof, reference is had to the following description, taken in connection with the accompanying drawings, while its scope will be pointed out in the appended claims.

Referring now to the drawings:

FIG. 4 is an exploded perspective view of the output driving connection of the apparatus of FIG. 1; while

DETAILED DESCRIPTION

Figure 1:
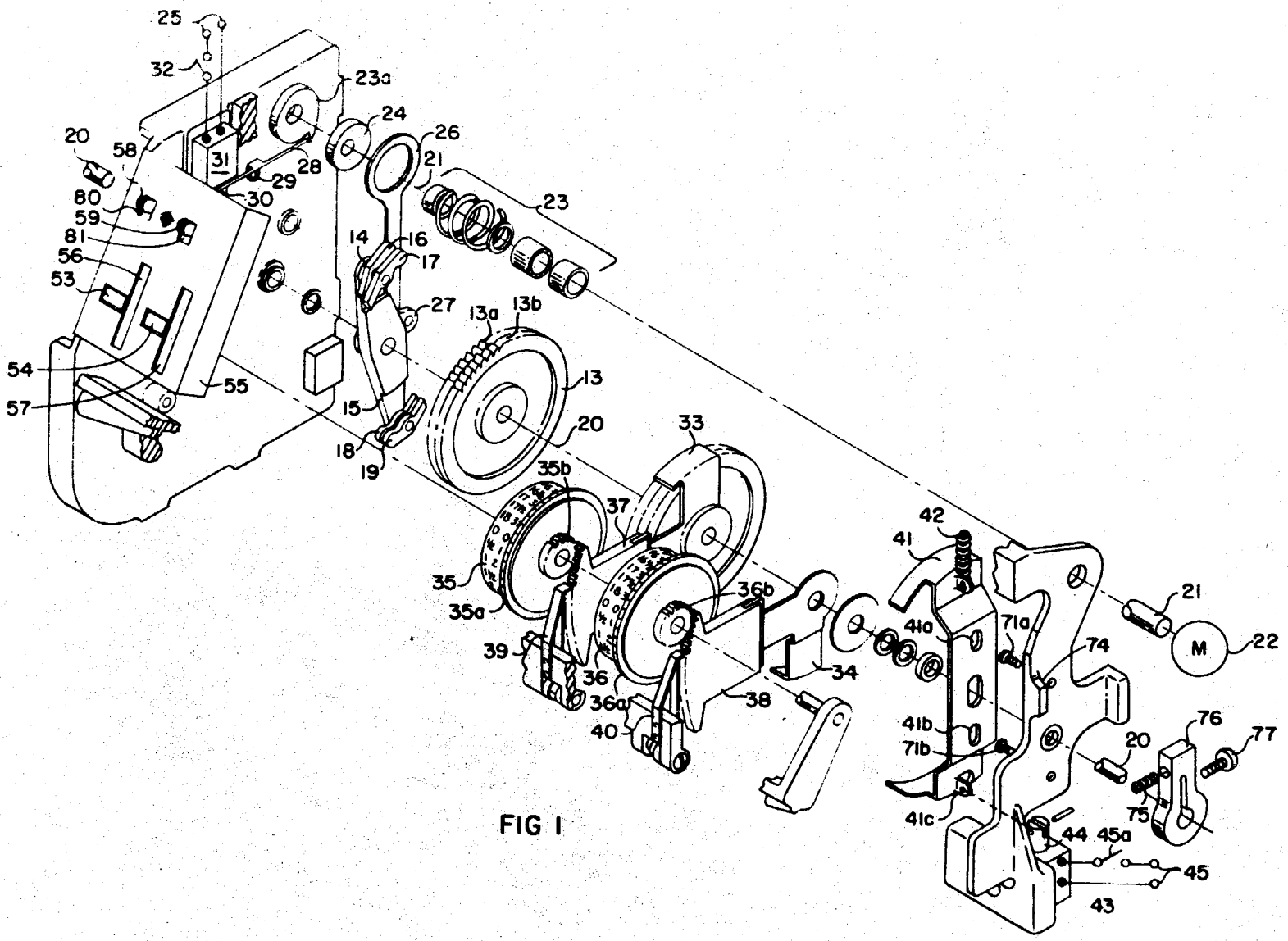
FIG. 1 is an exploded perspective view of an incremental drive mechanism embodying the invention.
Figure 2:
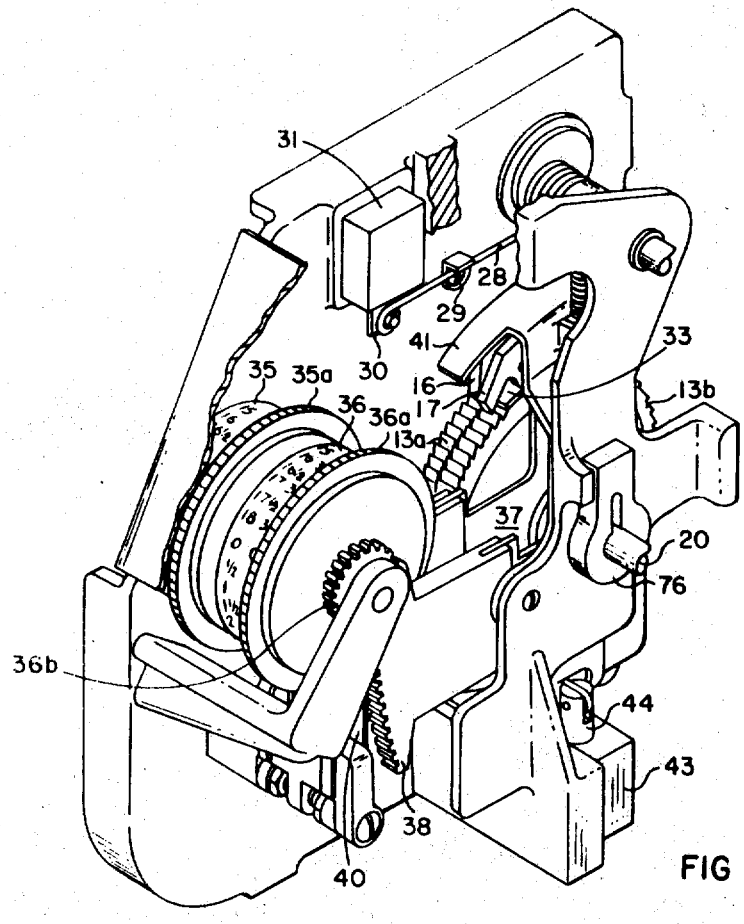
FIG. 2 is an assembled perspective view of a portion of the apparatus of FIG. 1.

Referring now more particularly to the several figures of the drawings, in which corresponding elements are given the same reference numerals, there is shown an incremental driving mechanism including an output drive shaft 10 (FIG. 4) carrying a pair of sprocket wheels 11 for advancing a conventional photographic film 12. This mechanism includes a ratchet and pawl drive for the shaft 10 (including a gear train described hereinafter) comprising a rotatable ratchet wheel 13 (FIG. 1) and two angularly displaced coaxial rotatable pawl carriers 14 and 15 which, as shown, may be unitary. The pawl carriers 14, 15 carry, respectively, pairs of pawls 16, 17 and 18, 19 pivoted thereon. The ratchet wheel 13 is shown as made up of two adjacent identical toothed wheels 13a and 13b angularly displaced by one-half of a tooth space. The pawls 16 and 18 are disposed to engage the wheel 13a and the pawls 17 and 19 engage the wheel 13b. The purpose of the double ratchet wheels and double pawls is to double the number of incremental advances for a ratchet wheel of any given size, the capacity of such a mechanism being limited by the tooth spacing. The ratchet wheel 13 is mounted on a shaft 20 on which the pawl carriers 14, 15 are rotatably mounted.

The drive mechanism further comprises means for selectively imparting one or more single oscillations to the pawl carriers 14, 15 through a predetermined angle. This means is shown in the form of a continuously rotating shaft 21 driven by a conventional motor 22 and a selectively operable single-revolution drive mechanism coupling the shaft 21 to the pawl carriers. This single-revolution mechanism may be in the form of a conventional single-revolution slip clutch 23, 23a driving an eccentric 24 rotatably mounted on shaft 21. Pivotally supported on eccentric 24 is a depending crank arm 26 pivotally connected to an extending arm 27 of the pawl carrier unit 14, 15 for oscillating it about the axis of the shaft 20 of the ratchet wheel 13. There is also provided a releasable stop arm 28 normally restraining the crank arm 26 from driving the pawl carriers 14, 15. This stop arm 28 is pivoted at 29 to the frame of the apparatus and normally engages the lower face of the clutch element 23a, holding it in a fixed position while the clutch 23 slips. The arm 28 is connected to the armature 30 of an electromagnet 31 controlled by a circuit including a master switch 32 and supply terminals 25, shown schematically since it forms no part of the present invention. In the usual case, the master switch 32 will be in the form of an electronic control device for energizing the electromagnet 31 during one or more cycles of revolution of the shaft 21.

Figure 3:
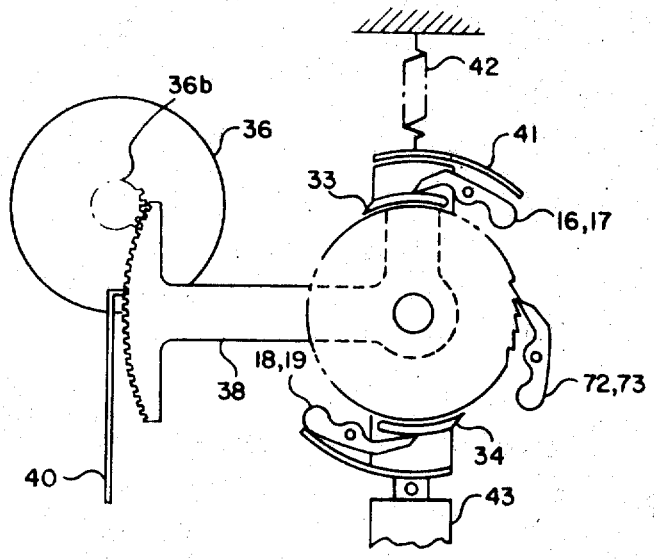
FIG. 3 is a schematic view of the adjustable driving mechanism for the ratchet wheel of FIG. 1 to aid in explaining the invention.

The drive mechanism of the invention further comprises a pair of arcuate masks 33 and 34 individually interposed between the pawls 16, 17 and 18, 19 and the ratchet wheel 13 and proportioned to limit the engagements therebetween to different angular extents, as shown more clearly in schematic FIG. 3. There is also provided means for selectively and independently angularly adjusting the masks 33, 34 to adjust the incremental angular rotation of the output drive shaft 10. Specifically, there is provided a pair of mask-adjusting means, each comprising a manually adjustable calibrated actuating element, preferably in the form of indicia-bearing rotatable dials 35 and 36. The dials 35, 36 have knurled rims 35a, 36a for manually adjusting the same and are provided with unitary pinions 35b, 36b, respectively, engaging toothed sectors 37 and 38, respectively, unitary with the arcuate masks 33, 34, respectively, and pivoted on the shaft 20. To facilitate retention of the dials 35, 36 in their set conditions, there are provided spring-biased detents 39 and 40 engaging the tooth sectors 37, 38, respectively.

In order selectively to make effective the upper pawls 16, 17 or the lower pawls 18, 19, the pawl carriers 14 and 15 are arranged approximately or exactly diametrically opposite with respect to the ratchet wheel 13 and there is provided a shroud 41 enclosing the pawls 16, 17, 18 and 19 and movable diametrically, specifically as shown vertically up and down, selectively to disengage one of the sets of pawls 16, 17 or 18, 19 from the ratchet wheel 13. As shown, the shroud 41 need not enclose the complete periphery around the ratchet wheel 13 but only the portion of arcuate travel of the pawls 16, 17, 18 and 19. The shroud 41 is biased to its uppermost position, disabling the pawls 18, 19 (FIG. 3), by means of a spring 42 and is slidable vertically by the engagement of slots 41a, 41b and the shoulder screws 71a, 71b. The shroud 41 is movable against the spring 42 to its lowermost position by an electromagnet 43 having an armature 44 engaging a lug 41c of the shroud 41. The electromagnet 43 is adapted to be energized from supply terminals 45 through a switch 45a which is shown schematically, although it will ordinarily be an electronic device forming a pair of the machine with which the drive mechanism is associated.

The drive mechanism of the invention further comprises an energy-storing friction device which backs up the shaft 20 to a fixed stop after each incremental movement, in order to ensure no over-travel of the ratchet wheel 13. During each incremental ccw movement, rotational motion is imparted to friction arm 76 which, in turn, compresses spring 75 which is located between the friction arm 76 and a protrusion 74 of the frame of the apparatus. Friction between the friction arm 76 and shaft 20 is controlled by screw 77. At the end of the incremental movement, spring 75 imparts reverse motion to friction arm 76 which, in turn, through friction, backs up shaft 20 until the ratchet wheel 13 is stopped by pawls 72, 73 (FIG. 3).

Figure 4:
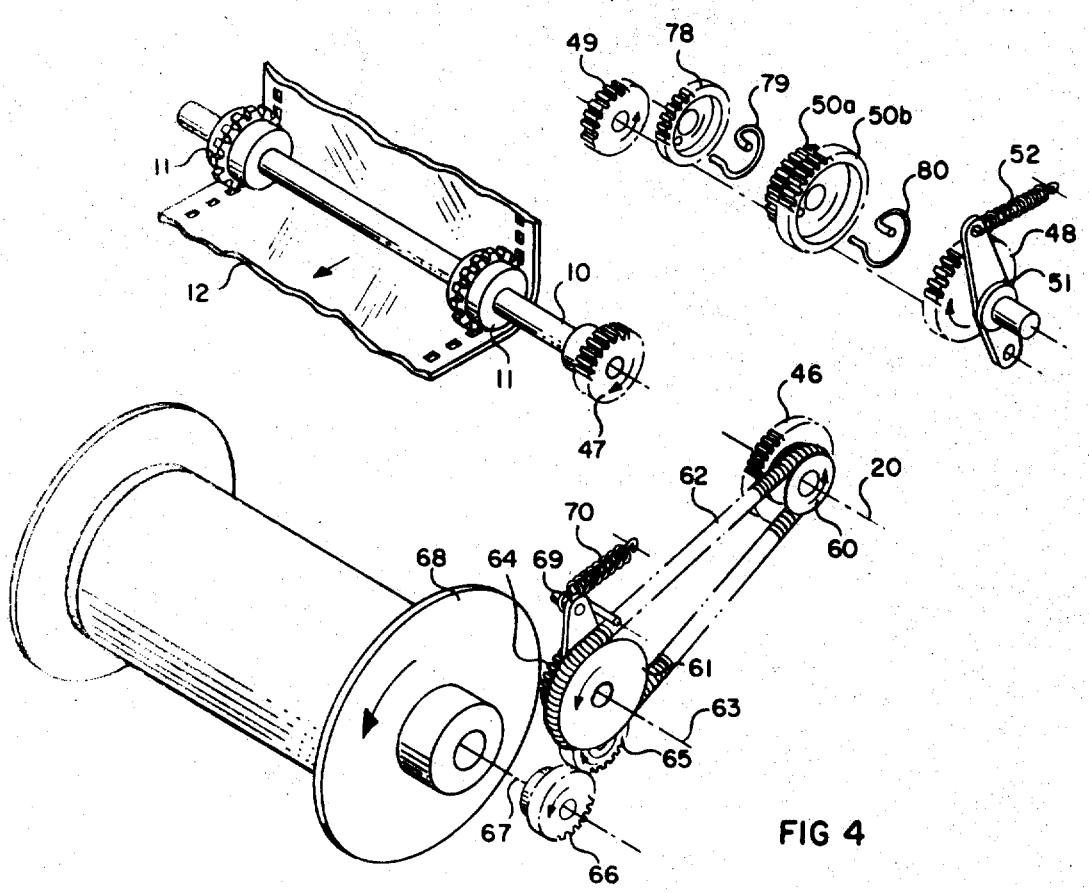

The drive mechanism of the invention further comprises a gear mechanism interconnecting the ratchet wheel shaft 20 and the output drive shaft 10, as shown in FIG. 4. This mechanism includes a gear 46 mounted on the shaft 20 and gear 47 mounted on the output shaft 10. An auxiliary gear mechanism includes gears 48 and 50b, preloaded with respect to each other by means of spring 80 and thus comprises an anti-backlash gear pair which engages the shaft gear 46. Unitary with gear 50b is a gear 50a which is preloaded with respect to gear 78 by means of spring 79, thus comprising a second antibacklash gear pair which engages with gear 49 which is mounted on an arm 51 pivoted about the axis of gears 48, 50a, 50b and 79 and biased, as by a spring 52, to engage the gear 49 with the output shaft gear 47. This arrangement not only permits the ready engagement and disengagement of the drive mechanism between the shafts 20 and 10, so that the film transport may be housed in a separate module, but also permits noncoaxiality of shafts 20 and 10 with no loss in angular transmission between shafts 20 and 10. That is, angular displacement of shaft 20 will produce identical angular displacement of shaft 10 in spite of the fact that shafts 20 and 10 are not coaxial.

Unitary with gear 46 is a pulley 60 which drives a pulley 61 through an elastic belt 62. The pulley 61 is rotatably mounted on a shaft 63 and, unitary therewith, is a gear 64 driving a gear 65 engaging a gear 66 on a shaft 67 on which is mounted a film takeup reel 68. The gear 65 is supported on an arm 69, in turn pivotally mounted about the axis of the gear 64 and biased into engagement with the gear 66 by means of a spring 70. As in the case of the sprocket drive shaft 10, the gearing described permits the takeup reel 68 to be disposed in a separate module which is readily engageable and disengageable with the incremental drive mechanism.

Figure 5:
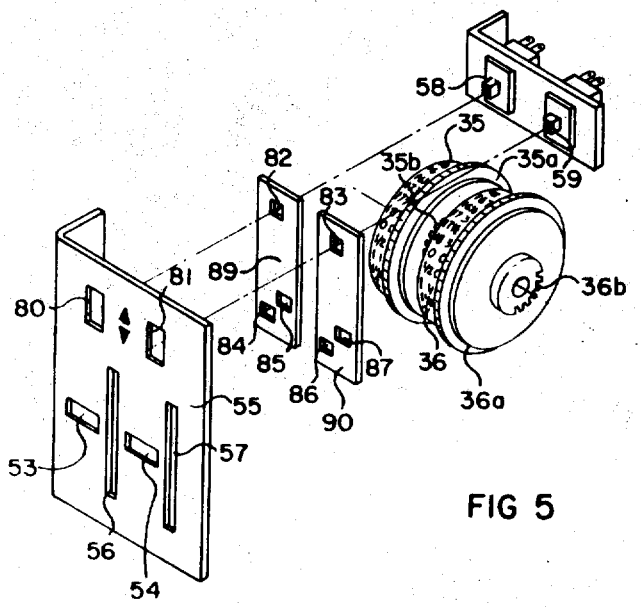
FIG. 5 is an exploded perspective view of the console panel assembly.

Above the dials 35, 36 as they appear through windows 53, 54, respectively, are operating handles of slide switches 58, 59 which appear through windows 80, 81, respectively. Sandwiched between the slide switches 58, 59 and the console panel 55 are dial masks 89, 90. To double the capacity of the incremental drive, each of the dials 35, 36 has two columns, one indicating exactly double the setting values of the first column, as shown in FIG. 5. By operating the handles of the slide switches 58, 59, which engage the dial masks 89, 90, respectively, through windows 82, 83, respectively, the desired incremental drive setting is unmasked on their respective dials. The positions of the handles of the slide switches 58, 59 also automatically control the switching means shown schematically at 32 for determining whether the electromagnet 31 is energized for an interval sufficient to permit the shaft 21 to make one or two revolutions.

OPERATION

It is believed the operation of the incremental drive mechanism of the invention will be apparent from the foregoing description. In brief, it will be assumed that the mechanism is producing a line-to-line advance of the film of a photocomposing machine of the type described in aforesaid copending application Ser. No. 519,906 and that the switch 45a is open so that the electromagnet 43 is deenergized and the shroud 41 is in its uppermost position as shown in FIG. 3, disabling the pawls 18, 19 so that the mask 33 is made effective. The master switch 32 is actuated by the machine after each line of text has been composed to advance the film 12 for composing the next line. The amount of the line advance may be adjusted over a wide range of values as required by the size of the type, the line spacing, etc. This is determined by the setting of the mask 33, which determines the portion of the arcuate movement of the pawls 16, 17 during which they engage the ratchet wheel 13. Actuation of the switch 32, as described, causes the eccentric 24 to be released for one or two turns of the shaft 21, as dictated by position of slide switches 58, 59, during which the pawls 16, 17 drive the ratchet wheel 13 and, through the shaft 20 and the gearing 46, 48, 50a, 50b, 78, 49, 47, the output shaft 10, thereby advancing the film 12 for a predetermined line spacing. Simultaneously, the film takeup reel 68 is driven through the elastic belt 61 and the gearing 64, 65, 66. The gear ratios are so chosen that the takeup reel 68 is always overdriven to maintain a desired tension in the film 12, such overdrive being accommodated by slipping of the belt 62.

Ordinarily, the masks 33, 34 permit engagement of the ratchet wheel 13 by the pairs of pawls 16, 17 or 18, 19 for different angular extents of their motion, to provide different incremental advances of the film 12. The drive mechanism can be shifted readily from one advance to the other by movement of the shroud 41 by the electromagnet 43 under the control of switch 45a without interrupting the operation of the machine. The switch 45a may be either a manual switch or constitute a control device forming a part of the machine with which the drive mechanism is associated. As previously stated, the operating handles of slide switches 58 and 59, appearing through windows 80, 81, respectively, can be actuated to modify the action of the switch 32 to permit one or two revolutions of the shaft 21 and, thus, to adjust the incremental line-to-line advance of the film 12 by the pawls 16, 17 or 18, 19.

It will be understood that when the incremental drive mechanism of the invention is associated with a photocomposing machine such as that described in aforesaid copending application Ser. No. 519,906, the switches 32 and 45a will be actuated during the "dead time" of the machine, that is, in the interval between the composition of successive lines of text. The switch 32 will ordinarily constitute a control device of such a machine while the switch 45a may optionally be a part of the machine or a separate manually operated element.

While there has been described what is, at present, considered to be the preferred embodiment of the invention, it will be obvious to those skilled in the art that various changes and modifications may be made therein, without departing from the invention, and it is, therefore, aimed in the appended claims to cover all such changes and modifications as fall within the true spirit and scope of the invention.

What is claimed is:

1. An incremental drive mechanism comprising:

an output drive shaft;

a ratchet and pawl drive for said drive shaft including a rotatable ratchet wheel and a *plurality of* coaxial [rotatable] *angularly displaced* pawl carrier*s* and pawl*s*;

means for selectively imparting one or more single oscillations to said pawl carrier*s* through a predetermined angle;

[an] arcuate mask*s* [interposed between] *individually associated with* said pawl*s and proportioned to limit engagements of different angular extents between their respective pawls* and said ratchet wheel [effective to limit the engagement therebetween];

[and] means for angularly adjusting said mask*s* to adjust the increment of angular rotation of said drive shaft[.]; *and means for disabling all but a selected one of said pawls.*

[2. A drive mechanism in accordance with claim 1 including a plurality of angularly displaced pawl carriers and pawls; arcuate masks individually associated with said pawls and proportioned to limit engagements of different angular extents between their respective pawls and said ratchet wheel; and means for disabling all but a selected one of said pawls.]

3. A drive mechanism in accordance with claim [2] *1* including means for selectively and independently adjusting said masks.

4. A drive mechanism in accordance with claim [2] *1* in which said pawl carriers are approximately diametrically opposed with respect to said ratchet wheel and which includes a shroud enclosing said pawls and movable diametrically selectively to disengage one of said pawls from said ratchet wheel.

5. A drive mechanism in accordance with claim 1 in which said mask-adjusting means comprises a manually adjustable calibrated actuating element.

6. A drive mechanism in accordance with claim 5 in which said actuating element is an indicia-bearing rotatable dial and detent mechanism.

7. A drive mechanism in accordance with claim 1 in which said means for oscillating said pawl carrier*s* includes a continuously rotating drive shaft and a selectively operable single-revolution drive mechanism coupling said shaft to said pawl carrier*s*.

8. A drive mechanism in accordance with claim 7 in which said drive mechanism includes a slip clutch, an eccentrically driven crank arm connected to said pawl carrier*s*, and a releasable stop arm normally restraining said crank arm from driving said pawl carrier*s*.

9. A drive mechanism in accordance with claim 1 in which said ratchet wheel is mounted on a shaft and which includes a readily engageable and disengageable auxiliary gear mechanism interconnecting said shaft and said output drive shaft.

10. A drive mechanism in accordance with claim 9 which includes a gear on each of said shafts and in which said auxiliary gear mechanism includes a first gear engaging one of said shaft gears and a second gear driven by said first gear and mounted on an arm pivoted about the axis of said first gear and biased to engage said second gear and the other of said shaft gears.

References Cited

The following references, cited by the Examiner, are of record in the patented file of this patent or the original patent.

UNITED STATES PATENTS

| | | | |
|---|---|---|---|
| 2,471,947 | 5/1949 | Giannini | 74—143 |
| 2,933,931 | 4/1960 | Lisinski | 74—149 |
| 2,967,046 | 1/1961 | Ratcliff | 74—152 |
| 3,149,591 | 9/1964 | Aiki et al. | 74—575 |
| 3,187,143 | 6/1965 | Kropp | 74—152 |
| 917,965 | 4/1909 | Regan | 74—576 |
| 2,029,677 | 2/1936 | Schubert | 74—143 |

FOREIGN PATENTS

| | | | |
|---|---|---|---|
| 371,391 | 4/1932 | Great Britain | 74—143 |

FREDERICK L. MATTESON, Jr., Primary Examiner

W. S. RATLIFF, Jr., Assistant Examiner